United States Patent [19]
Agrawal

[11] Patent Number: 5,218,825
[45] Date of Patent: Jun. 15, 1993

[54] COPRODUCTION OF A NORMAL PURITY AND ULTRA HIGH PURITY VOLATILE COMPONENT FROM A MULTI-COMPONENT STREAM

[75] Inventor: Rakesh Agrawal, Allentown, Pa.

[73] Assignee: Air Products and Chemicals, Inc., Allentown, Pa.

[21] Appl. No.: 854,939

[22] Filed: Mar. 19, 1992

Related U.S. Application Data

[63] Continuation-in-part of Ser. No. 792,849, Nov. 15, 1991.

[51] Int. Cl.[5] .................................. F25J 3/00
[52] U.S. Cl. .................................. 62/11; 62/24; 62/39
[58] Field of Search .................. 62/11, 24, 39

[56] References Cited

U.S. PATENT DOCUMENTS

| | | | |
|---|---|---|---|
| 4,615,716 | 10/1986 | Cormier et al. | 62/24 |
| 4,662,918 | 5/1987 | Agrawal | 62/13 |
| 4,783,210 | 11/1988 | Ayres et al. | 62/24 |
| 4,871,382 | 10/1989 | Thorogood et al. | 62/18 |
| 4,895,583 | 1/1990 | Flanagan et al. | 62/24 |
| 4,902,321 | 2/1990 | Cheung | 62/24 |
| 4,957,523 | 9/1990 | Zarate et al. | 62/13 |
| 5,049,173 | 9/1991 | Cormier et al. | 62/24 |

*Primary Examiner*—Ronald C. Capossela
*Attorney, Agent, or Firm*—Russell L. Brewer; James C. Simmons; William F. Marsh

[57] ABSTRACT

This invention relates to an improved process for the coproduction of a volatile component with normal purity and ultra high purity from a stream containing other heavier components and contaminated with lighter impurities which are more volatile than the volatile component. The improvement resides in removing a stream of the volatile component which is substantially free of the lighter impurities and then introducing the stream stripped of impurities to a second distillation column for fractionation. The second distillation column is equipped with a rectification section wherein the stream is rectified and the volatile component obtained in ultra high purity as an overhead. The volatile component with normal purity is obtained from the first distillation column as an overhead.

3 Claims, 3 Drawing Sheets

COPRODUCTION OF A NORMAL PURITY AND ULTRA HIGH PURITY VOLATILE COMPONENT FROM A MULTI-COMPONENT STREAM

CROSS REFERENCE TO RELATED APPLICATION

This application is a continuation-in-part of U.S. Ser. No. 07/792,849 having a filing date of Nov. 15, 1991. The application has the same title as this continuation-in-part application.

TECHNICAL FIELD

This invention relates to the distillation separation of streams for the coproduction of a normal purity and ultra high purity volatile component in the gas stream.

BACKGROUND OF THE INVENTION

The distillation separation of streams such as air and natural gas streams which are contaminated with lighter impurities is well known. Typically, an overhead containing the volatile component contaminated with lighter impurities and a bottom fraction comprising the heavy component is obtained. Technology advancements in many industrial fields have required products of higher purity than are normally obtained in the conventional distillation processes. The attainment of higher purity products has required further processing and distillation to effect removal of the lighter impurities from the volatile component. Due to these additional process steps substantial amounts of energy or additional equipment or both to achieve a higher level of purity of the volatile component is required. Ultra high purity product for example is required in the area of semiconductors and integrated circuits. Even though such technologies require ultra high purity product, sometimes the volumes required are not sufficient to support a plant dedicated to ultra high purity operation. Other technologies applications may not require the elaborate processing necessary to produce the ultra high purity product. Those technologies cannot afford the cost factor associated with the processing of stream required to produce ultra high purity components. Accordingly, there is substantial interest in the distillation field, and particularly in the cryogenic field, to produce a component of one purity and the same component in ultra high purity. In that way, larger units can be built and the products distributed to the respective technologies. Representative art showing the distillation of streams and the separation of components therein into fractions are as follows:

U.S. Pat. No. 4,662,917 discloses a single column process for the production of nitrogen and oxygen. In that process, air is freed of its impurities and cooled to its dew point temperature and introduced into a single column for separation into its components. An oxygen-rich heavy stream is removed from the bottom of the column and removed as a product. A nitrogen-rich fraction is removed from the top of the column. A portion is condensed against oxygen-rich heavy stream in a boiler/condenser wherein a portion is returned as reflux to the single column and a portion removed as product.

U.S. Pat. No. 4,871,382 discloses a conventional dual column process for the separation of air into its components which includes a side arm column for the recovery of argon. In that process, air is introduced to a high pressure column wherein a nitrogen-rich fraction is generated at the top of the column and an oxygen-rich fraction is generated at the bottom of the column. A portion of the oxygen-rich fraction and nitrogen-rich overhead fraction is introduced to a low pressure column wherein further fractionation is effected. A nitrogen-rich overhead is recovered as product from the low pressure column and oxygen, either in liquid or gaseous form, is recovered from the bottom of the low pressure column. An argon stream is obtained by removing an argon-rich side stream from the low pressure column and fractionating in a side arm column wherein argon is removed as an overhead fraction and oxygen is removed as a bottom fraction.

U.S. Pat. No. 4,902,321 discloses a process for the production of ultra high purity nitrogen by the cryogenic distillation of an air stream. As in the above references, an oxygen-rich stream is generated at the bottom of a distillation column, and a nitrogen-rich stream is generated as an overhead in the column.

In contrast to the processes described in the aforementioned patents, a portion of the nitrogen overhead is condensed in a boiler/condenser wherein the impurities in the overhead are removed as a lighter impurity. The condensate from this boiler/condenser is then let down in pressure and vaporized in the same boiler/condenser to provide a high purity nitrogen product stream which has lower concentration of lighter impurities. Clearly, the disadvantage of this system is that the high purity nitrogen product is at a pressure which is lower than the distillation column pressure.

U.S. Pat. No. 5,049,173 discloses a process for producing ultra high purity oxygen from an air stream. In the process, as with other cryogenic distillation processes for the separation of air, an oxygen-rich bottoms fraction and a nitrogen-rich overhead fraction is produced from the distillation column. An oxygen-containing stream essentially free of heavy components is charged to a second fractionation column wherein the oxygen is stripped of volatile impurities and an ultra high purity liquid oxygen fraction is obtained.

SUMMARY OF THE INVENTION

This invention relates to an improvement in a distillation separation of a multi-component stream comprising a major volatile component (A), a major heavy component (B), and at least one lighter impurity (I) which has a higher volatility than component (A). In a conventional process, component (A) is separated from component (B), and (A) is removed as an overhead fraction along with lighter impurity (I). A stream rich in component (B) is removed as a bottoms fraction and is substantially free of lighter impurity (I). The improvement for coproduction of a stream comprising component (A) of normal purity and containing small amounts of lighter impurity (I) and a stream of component (A) in ultra high purity which is substantially free of lighter impurity (I) is obtained through the following distillation sequence. A multi-component stream is fed to a first distillation column having an upper rectification zone for effecting enrichment of component (A) and removal therefrom as an overhead and a lower stripping zone for the enrichment of component (B) and removal therefrom as a bottoms fraction. A stream is withdrawn from the first distillation column at a point where the stream contains a substantial amount of component (A) and is substantially free of any lighter impurity (I). This stream then is introduced to a second distillation column having at least a rectification zone. Introduction is made at a point below such rectification zone wherein the volatile component (A) is enriched in the rectification zone and ultimately withdrawn as a fraction above the rectification zone. A bottoms fraction rich in component (B) is withdrawn at a point below the rectification zone. The stream from above the rectification zone of the second distillation column is of substantially higher purity than the overhead from the first distillation column.

Aside from the fact that coproduction of a volatile component in different purities, e.g., high purity and ultra high purity, can be achieved, several advantages are achieved by carrying out the distillation in the sequence set forth. These advantages include:

an ability to achieve coproduction of a volatile component (A) without paying a penalty in terms of energy consumption;

an ability to produce component (A) in both high purity and ultra high purity at similar pressures without effecting an additional reboil and/or condensation; and, an ability to recover component (A) in high yield.

DRAWINGS

DETAILED DESCRIPTION OF THE INVENTION

The process described herein is particularly adapted for the coproduction of a volatile component (A) from a multi-component stream containing a heavy component (B) and at least one lighter impurity (I) which is of higher volatility than component (A). In many cases, the multi-component stream will contain other components. Typical streams for separation include air where high purity and ultra high purity nitrogen are desired as a coproduct. The process is equally adapted for the production of hydrocarbons of variable purity.

Figure 1:
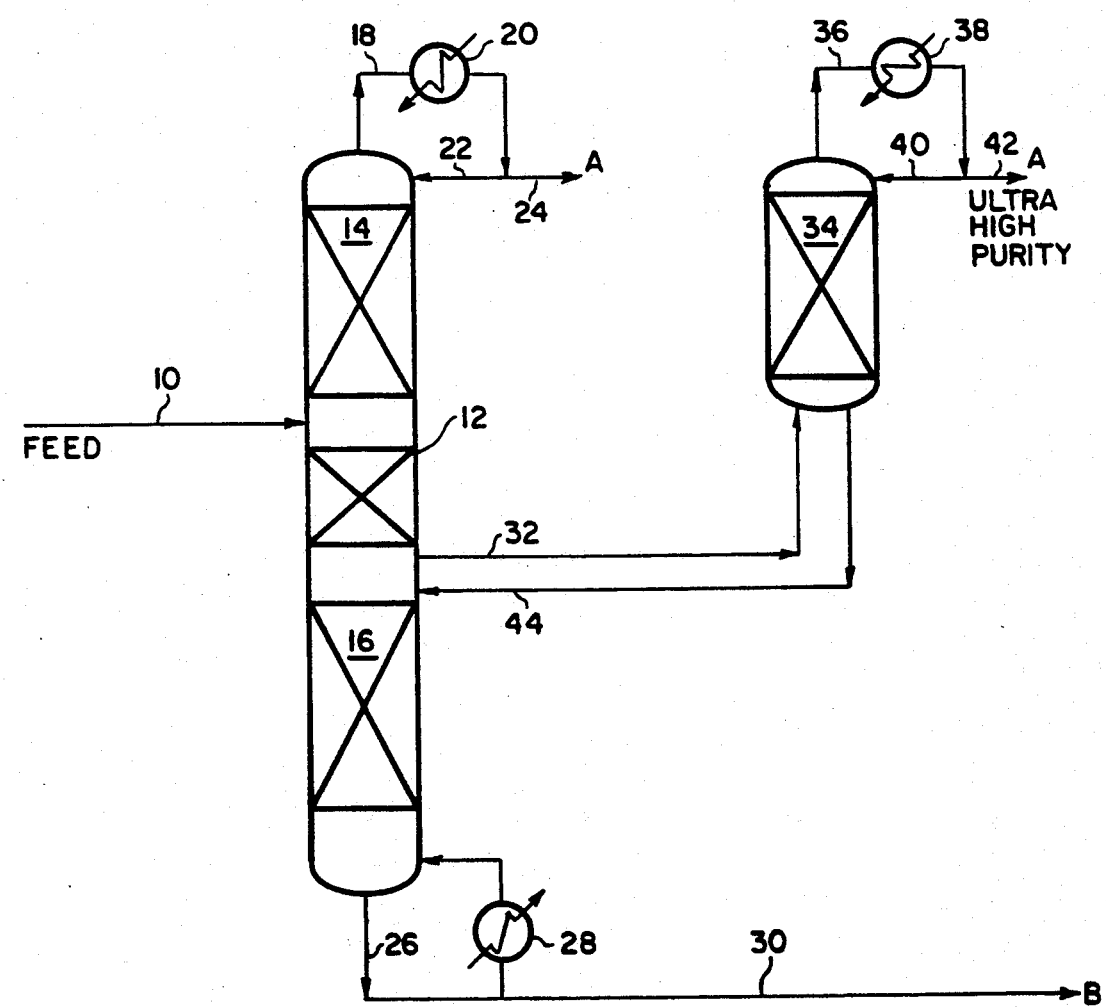
FIG. 1 is a process flow scheme for a multi-column distillation system for the coproduction of nitrogen of dissimilar purity.

In its simplest form, the process may best be understood by referring to FIG. 1. In this embodiment, a multi-component stream comprising a volatile major component (A), and a heavy component (B) and at least one lighter impurity I is distilled. In the case of an air feed, nitrogen is the volatile major component (A) with a concentration of 78.12%, oxygen with a concentration of 20.95% is the predominant heavy component; however, other components heavier than nitrogen such as argon (0.93%), etc., are typically lumped in a heavy component (B). The lighter impurities (I) which are more volatile than nitrogen and present in air are hydrogen (concentration up to 10 ppm), helium (5.3 ppm) and neon (18 ppm). For a general feed other than air, the concentration of lighter impurities (I) can be much higher than ppm levels.

The multi-component stream is fed via line 10 to distillation column 12 comprising a rectification section 14 and a stripping section 16. The feed is introduced intermediate the rectification and stripping section wherein the volatile component (A) and lighter impurity (I) are enriched and generated as a overhead which is removed via line 18. The overhead is condensed in condenser 20 and a portion of the condensate returned via line 22 as reflux to the top of distillation column 12. The remainder of the condensate is removed via line 24. It comprises component (A) in major portion contaminated with lighter impurities. Alternatively, a portion of stream 18 could be removed as gaseous product. In case of air distillation, nitrogen (component A) is produced at a purity greater than 99.5% and contains up to 50 ppm of lighter impurities (I) such as hydrogen, helium, neon, etc.

The heavy component (B) in feed stream 10 is enriched in stripping section 16 and a liquid fraction rich in heavy components is withdrawn via line 26 from the bottom of distillation column 12. A portion of this liquid fraction is vaporized in boiler/condenser 28 and the vapor reintroduced for stripping at the bottom of stripping section 16. The balance of the liquid fraction rich in heavy component (B) is removed via line 30.

The generation of an ultra high purity fraction of component (A) is effected by removing a stream 32 containing a substantial portion of component (A) which is contaminated with component (B), but essentially free of any lighter impurity (I) from distillation column 12. The concentration of the lighter impurity (I) in this stream is less than that required in the ultra high purity coproduct from the top of the auxiliary rectifying column 34. For example, in air distillation to coproduce ultra high purity nitrogen containing less than 5 ppb of the combined concentration of the light impurities hydrogen, helium and neon, the combined concentration of these light impurities in this stream should be less than 3 ppb. The point of removal of the stream is from a suitable location of the stripping zone 16. The stream is removed via line 32 wherein it is introduced to an auxiliary rectifying column 34 having a rectification zone therein. The feed is purified wherein an ultra high purity product is generated within the top section of the rectification zone and an ultra high purity vapor removed via line 36. This vapor stream is at least partially condensed in boiler/condenser 38 and a portion of the condensate returned as reflux for effecting stripping of the heavier component, i.e., component (B) from any stream. The balance of component (A), which is in ultra high purity, is removed via line 42. Alternatively, a portion of the ultra high purity vapor in line 36 may be removed to provide gaseous ultra high purity coproduct (A). The bottoms fraction which is rich in component (B) is removed from the bottom of auxiliary rectifying column 34 via line 44 and introduced to distillation column 12 at a suitable point in the stripping section of column 12.

It is readily observed from this flow diagram that the pressure of component (A) i.e. nitrogen with normal purity and ultra high purity nitrogen is essentially the same and that the coproduction of component (A) or nitrogen in conventional purity and ultra high purity component A or nitrogen is achieved without effecting further condensation and vaporization of the respective streams as, for example, is apparent from the flow scheme in the '321 patent.

Figure 2:
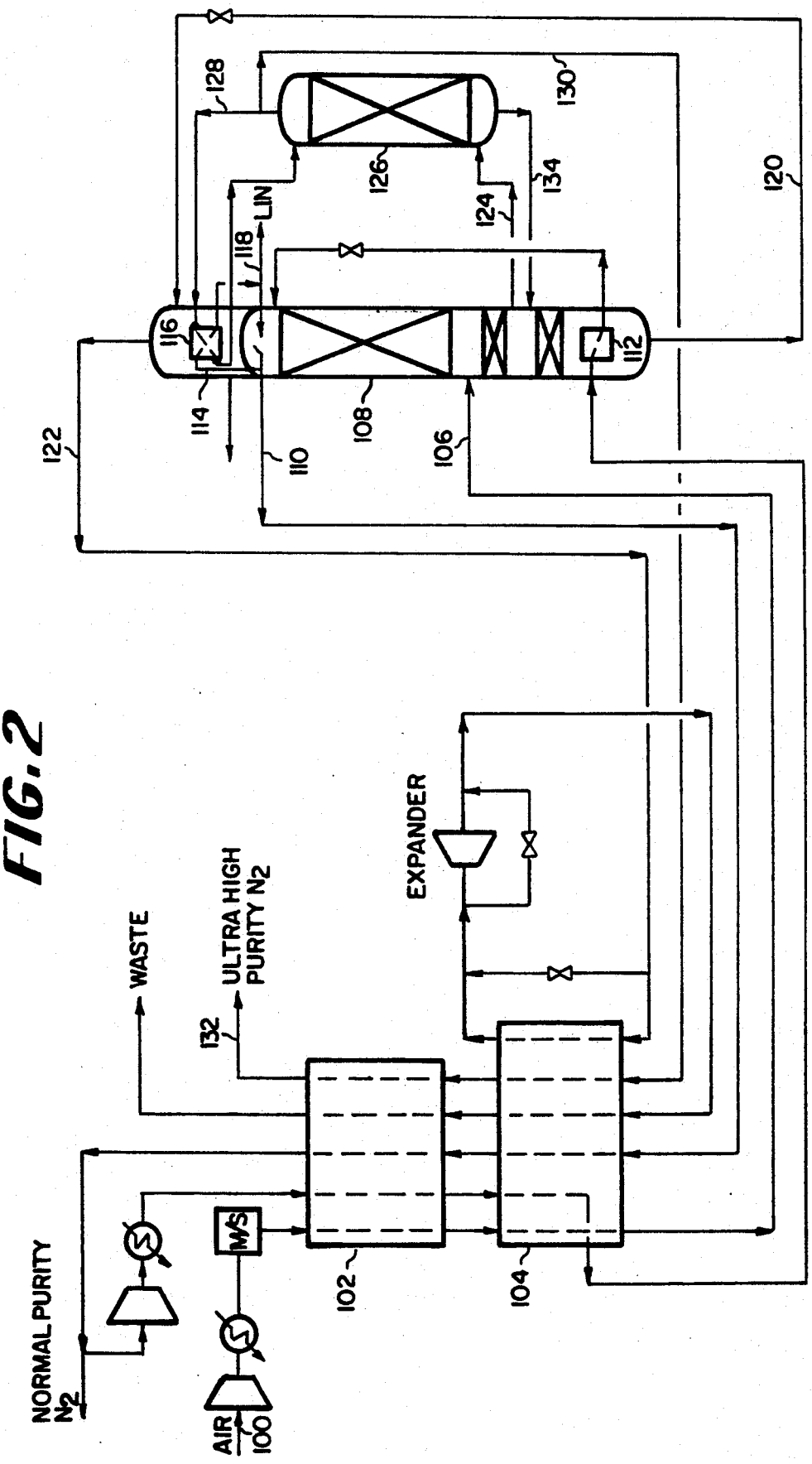
FIG. 2 is a process flow scheme for a multi-column distillation system using a waste expander.

FIG. 2 represents an embodiment of the invention involving the cryogenic distillation of air wherein nitrogen of conventional purity and ultra high purity are obtained as products. The process achieves these results through a conventional waste expander cycle having a nitrogen recycle modified in accordance with the concepts described herein. The conventional waste expander cycle having a nitrogen recycle and producing normal purity nitrogen is described in U.S. Pat. No. 4,400,188. More specifically in the modified process, air is introduced via line 100, compressed, cooled and water and carbon dioxide are adsorbed on a molecular sieve bed prior to introduction to a main heat exchanger series designated 102 and 104. Air is cooled close to its dew point temperature in heat exchanger systems 102 and 104 and then introduced via line 106 to a single column distillation system 108. A nitrogen rich fraction is generated as an overhead in the top of the column and an oxygen rich fraction is generated at the bottom of the column. A portion of the nitrogen rich vapor fraction is removed via line 110 and warmed against process streams in heat exchanger 104 and 102. Part of that stream is removed as normal purity product and a portion recompressed, cooled and condensed in boiler/condenser 112 in the bottom of distillation column 108. That condensed stream then is isenthalpically expanded and introduced to the top of the column for providing reflux to the column. Another portion of the nitrogen rich vapor is removed via line 114, condensed in boiler/condenser 116 and at least a portion of the condensate returned to the top of the column as reflux. The balance may be removed via line 118 as optional liquid nitrogen product of normal purity. Crude liquid oxygen from the bottom of distillation column 108 is conveyed via line 120 to the vaporizer side of boiler/condenser 116 and vaporized against the nitrogen rich vapor obtained from the top of the column. The vaporized crude liquid oxygen is removed from the vaporizer section via line 122, warmed, expanded, warmed again against process streams and removed as a waste product.

Ultra high purity nitrogen is removed as a coproduct from this process by removing a stream containing nitrogen via line 124 from the stripping section of distillation column 108 at a point below the introduction of the feed air to the column. This stream is essentially free of lighter impurities, e.g. less than 5 ppm by volumes of highly volatile impurities such as hydrogen, helium and neon and preferably less than 5 ppb by volume. This stream is introduced to a second distillation column 126 having a rectification zone therein. The nitrogen containing stream is fed to column 126 and is freed of residual heavies producing an ultra high purity nitrogen product at the top of the column. A portion of the overhead from the top of distillation column 126 is conveyed via line 128 to boiler/condenser 116 and at least a portion of the condensed fraction returned as reflux to the top of distillation column 126. The balance of the ultra high purity nitrogen product is removed via line 130 wherein it is warmed against process streams and removed as a product via line 132. If desired, a portion of the condensed stream 128 from the boiler/condenser 116 could be produced as a liquid nitrogen product of ultra high purity. The oxygen component in the stream introduced to distillation column 126 is removed as a liquid from the bottom of that column via line 134. That fraction is returned to the stripping section of distillation column 108.

FIG. 2 thus illustrates a modification of a conventional waste expander nitrogen recycle process for the separation of air wherein ultra high purity and normal purity nitrogen are produced as coproducts. The ultra high purity nitrogen is produced without a reduction in pressure from that of standard product nitrogen and essentially no additional energy is provided to the system other than what is present in the process streams.

FIG. 2 shows an application of the invention suggested in FIG. 1 to a nitrogen generator having a waste expander and nitrogen recycle. The concept is applicable to other nitrogen generators with a stripping section. Other examples of single column nitrogen generators with a stripping section are described in U.S. Pat. Nos. 4,464,188; 4,662,916-918; 4,594,085 and 4,867,773 and are incorporated by reference. In these examples, boilup at the bottom of the distillation column is provided by either condensing a nitrogen stream or an air stream or a combination thereof. The invention is also applicable to double column nitrogen generating processes well known in the art. Examples of the double column nitrogen generators can be found in GB 1,215,377; U.S. Pat. Nos. 4,617,026 and 5,006,137 and are incorporated by reference. In such double column processes, the stripping section of the lower pressure column (also sometimes referred to as upper column or medium pressure column) provides the feed to the auxiliary rectifying column for the coproduction of ultra high purity nitrogen.

Figure 3:
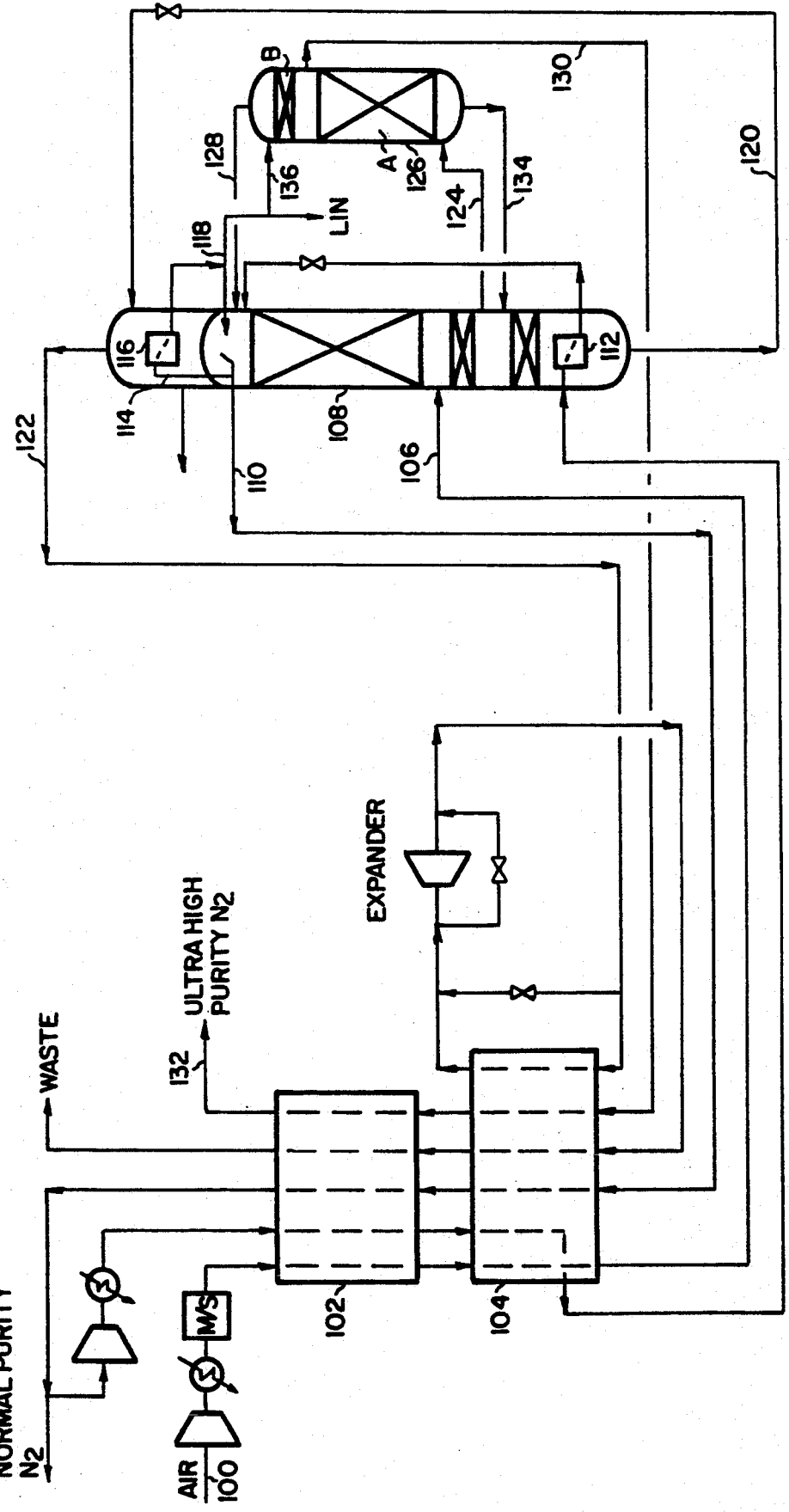
FIG. 3 is a process flow scheme for a multi-column distillation system using a waste expander, as in FIG. 2, except that the side arm column incorporates a stripping section above the rectification portion of the side arm column.

FIG. 3 shows an application of the invention suggested in FIGS. 1 and 2 wherein a stripping section is incorporated above the rectification zone in second distillation column 126. With the modifications shown it is possible to enhance the recovery, i.e., co-produce a larger fraction of nitrogen as product at ultra-high purity. For purposes of facilitating analysis of the process improvement described in FIG. 3, vis-a-vis that of FIG. 2 the focus will be directed towards second distillation column 126 and its relationship to distillation column 108. In the embodiment shown, second distillation column 126 is separated into two stages A and B wherein rectification is carried out in zone A and stripping is carried out in zone B. In contrast to the embodiment of FIG. 2, a portion of the liquid condensate in line 118 is introduced to second distillation column 126 at a point above zone B wherein any light impurities are stripped from said condensate stream in the stripping section designated as zone B. If needed, the balance of the condensate in line 118 is removed as product. The vapor in the overhead above the stripping section designated zone B is removed via line 128 and returned to the overhead of distillation column 108. A portion or substantially all of this overhead from line 128 can be removed as product via line 110. The overhead in line 128 could be introduced to boiler/condenser 116 as in FIG. 2 but equipment fabrication is much simpler in the scheme shown wherein the overhead from second distillation column 126 removed via line 128 is introduced directly to distillation column 108. Ultra-high purity nitrogen product is removed via line 130 from second distillation column 126 at a point intermediate rectification zone A and stripping section designated zone B. Not shown in the figure, but if needed a liquid nitrogen stream of ultra-high purity could also be withdrawn as product from this same location of the distillation column 126.

By the introduction of a stripping section above the rectification section in second distillation column 126 and utilizing a portion of the condensate obtained from the overhead of distillation column 108, substantially all of the overhead from second distillation column 126 removed via line 128 can be returned to main distillation column 108. This allows the flow of liquid in line 136 to the distillation column 126 to be greater than that of the vapor in line 128. This permits a larger fraction of ultra-high purity nitrogen product to be moved via line 130.

In the embodiment shown in FIG. 2 the overhead from second distillation column 126 was split into two portions with one portion being returned via line 128 to boiler/condenser 116 and the balance being recovered at nitrogen product of ultra-high purity via line 130.

It is understood that various modifications can be made to the process schemes described to achieve desired results. For example, another system in series to that described in FIG. 1 may be employed where a multi-component feedstream is to be processed.

Even though FIG. 1 shows an example for binary separation, the suggested method is applicable to other separations having more than two major components. For example, it can be applied to any known ternary distillation scheme. Consider a feed stream containing three major components (A), (B) and (C) and contaminated with at least one lighter impurity (I). Of the three major components, (A) is most volatile followed by (B) and then (C). The lighter impurity (I) is more volatile than (A). The objective is to coproduce an ultra high purity product stream A which is substantially lean in lighter impurity (I). Generally, a ternary distillation employs at least two main distillation columns. Following the idea demonstrated in FIG. 1, it is obvious that a suitable stream containing (A), but nearly free of lighter impurity (I), can be removed from a stripping section of at least one of the main distillation columns. This stream can be then distilled in an auxiliary rectifying column to coproduce ultra high purity product (A).

What is claimed:

1. In the distillation separation of a multi-component stream, comprising a major volatile component (A), a major heavy component (B) and at least one lighter impurity (I) having a higher volatility than component (A), wherein a fraction enriched in component (A) is generated as an overhead fraction and a fraction enriched in component (B) is generated as a bottom fraction, the improvement for the coproduction of a stream comprising component (A) in normal purity and a stream of component (A) in ultra high purity which is substantially free of lighter impurity (I) which comprises:

introducing at least a portion of said multi-component stream as a feed to a first distillation column having a rectification zone for effecting enrichment of major volatile component (A) and removal thereof as an overhead stream, a portion of which is recovered as product of normal purity; and a stripping zone for the enrichment of component (B) and removal therefrom as a bottoms fraction;

removing a stripped stream comprising components (A) and (B) which stream is substantially free of any impurity (I) from said stripping zone;

introducing said stripped stream to a second distillation column having a rectification zone for effecting separation of major volatile component (A) from major heavy component (B);

separating component (A) from component (B) in said rectification zone; and, recovering component (A) in a higher purity than component (A) is recovered from said first distillation column.

2. In a process for the separation of air into at least a nitrogen component by cryogenic distillation, wherein a feed is compressed, cooled to its dew point temperature and cryogenically distilled in a multi-column distillation system, wherein nitrogen is generated as an overhead stream and removed as product from at least one of the columns in said distillation system and oxygen is removed as a bottoms fraction from at least one of the columns in said distillation system; the improvement for coproducing normal purity nitrogen and ultra high purity nitrogen which comprises the following steps:

generating a feedstream of nitrogen and oxygen which is substantially free of lighter impurities in the stripping section of a first column in said multi-column distillation system;

removing said nitrogen/oxygen fraction from said stripping zone and introducing it to a second distillation column having at least a rectification zone comprised in the multi-column distillation system;

separating the nitrogen from said oxygen in said rectification zone within said column thereby generating an overhead fraction comprising nitrogen of higher purity than was generated in said first distillation column and an bottoms fraction comprising oxygen; and, recovering said nitrogen of higher purity.

3. The process for the distillation separation of a multi-component stream of claim 1 wherein said second distillation column has a rectification zone for effecting separation of major volatile component (A) from a major heavy component (B) and a stripping zone above said rectification zone;

introducing said stripped stream from the first distillation column to said second distillation column at a point below the rectification zone wherein the major volatile component (A) is generated as an overhead above said rectification zone and intermediate said rectification zone and said stripping zone in said second distillation column and a major heavy component (B) as a bottom fraction in said second distillation column;

returning the major heavy component (B) to the first distillation column;

introducing a liquid fraction obtained from said first distillation column comprising components (A) and (I) and substantially free of major heavy component (B) to said second distillation column at a point above said stripping section wherein an overhead rich in component (I) is generated above said stripping section; and returning at least a portion of said overhead above said stripping section in said second column to an overhead portion of said first distillation column.

* * * * *